(12) United States Patent
Popp et al.

(10) Patent No.: US 8,355,609 B2
(45) Date of Patent: Jan. 15, 2013

(54) LENS ARRANGEMENT FOR OPTICAL ROTARY JOINTS

(75) Inventors: Gregor Popp, Munich (DE); Nils Krumme, Feldafing (DE)

(73) Assignee: Shlelfring und Apparatebau GmbH, Fuerstenfeldbruck (DE)

( * ) Notice: Subject to any disclaimer, the term of this patent is extended or adjusted under 35 U.S.C. 154(b) by 420 days.

(21) Appl. No.: 12/436,962

(22) Filed: May 7, 2009

(65) Prior Publication Data

US 2009/0279829 A1    Nov. 12, 2009

(30) Foreign Application Priority Data

May 8, 2008  (DE) .......................... 10 2008 001 653

(51) Int. Cl.
*G02B 6/32* (2006.01)

(52) U.S. Cl. ................. 385/33; 385/26; 385/51

(58) Field of Classification Search ....... 385/33
See application file for complete search history.

(56) References Cited

U.S. PATENT DOCUMENTS

| | | |
|---|---|---|
| 5,568,578 A | 10/1996 | Ames |
| 6,328,482 B1 | 12/2001 | Jian |
| 6,587,618 B2 * | 7/2003 | Raguin et al. ............ 385/33 |
| 6,980,364 B2 * | 12/2005 | Herr et al. ............ 359/642 |
| 2004/0017984 A1 | 1/2004 | Thiele et al. |
| 2004/0165822 A1 | 8/2004 | Kobayashi et al. |
| 2005/0036735 A1 | 2/2005 | Oosterhuis et al. |

FOREIGN PATENT DOCUMENTS

| | | |
|---|---|---|
| DE | 102004026498 | 12/2005 |
| DE | 102006022023 | 11/2006 |
| DE | 102006039516 | 3/2008 |
| EP | 1331497 | 7/2003 |
| JP | 63-24204 | 2/1988 |
| WO | 01/98801 | 12/2001 |
| WO | 02/075407 | 9/2002 |

\* cited by examiner

*Primary Examiner* — Omar Rojas
(74) *Attorney, Agent, or Firm* — Kevin L. Daffer; Daffer McDaniel, LLP (57) ABSTRACT

According to one embodiment, an optical rotary joint comprises a first collimator arrangement for coupling-on first light-waveguides, and a second collimator arrangement for coupling-on second light-waveguides, with the latter being rotatably supported relative to the first collimator arrangement about a rotation axis. A Dove prism is provided between the first and second collimator arrangements as a derotating element. The first and second collimator arrangements have at least one micro-lens array on which light-waveguides with associated ferrules are disposed. In order to avoid tensile forces from arising in the arrangement, or as a result of individual ferrules becoming interconnected by an applied adhesive, trenches, barriers, or also coatings are provided between the individual ferrules.

6 Claims, 9 Drawing Sheets

LENS ARRANGEMENT FOR OPTICAL ROTARY JOINTS

PRIORITY CLAIM

The present application claims priority to German Patent Application No. 102008001653.5 filed on May 8, 2008.

BACKGROUND OF THE INVENTION

1. Field of the Invention

The invention relates to an optical rotary joint, and a lens system particularly for use in optical rotary joints, and also a method for manufacturing a lens system of this kind.

2. Description of the Related Art

Various transmission systems are known for transmission of optical signals between units that are rotatable relative to each other.

U.S. Pat. No. 5,568,578 discloses an optical rotary joint for a plurality of channels, having a Dove prism. An arrangement having a plurality of GRIN lenses is provided for coupling light into or out of glass fibers.

U.S. Patent Application Publication No. 2005/0036735 discloses an optical rotary joint for a plurality of channels, having a Dove prism as a derotating element. Light supplied by light-waveguides is coupled via collimators into the Dove prism, where it is derotated, and fed via further collimators into light-waveguides to be carried away.

Another kind of optical rotary joint is disclosed in WO 01/98801. This describes a micro-optical system having optical and mechanical components in the form of a one-piece component part. With this design, a substantially higher packing density of individual glass fibers can be achieved.

German Patent Publication No. DE 102006022023 discloses another optical rotary joint having collimators that comprise a plurality of lenses. In particular, with collimators having a large number of lenses, unexpected early failures occur after only a short period of operation.

BRIEF SUMMARY OF THE INVENTION

The following description of various embodiments of optical rotary joints and lens systems is not to be construed in any way as limiting the subject matter of the appended claims.

An object of the disclosure set forth herein is to provide a low-cost optical rotary joint, and also a lens system for a rotary joint of this kind, wherein the lens system can be manufactured reproducibly and exhibits only an extremely small number of early failures, and thus an increased reliability. Furthermore, a method is provided herein for manufacturing a lens system of this kind.

According to one embodiment, a lens systems comprises a micro-lens array and either: (i) a plurality of ferrules enclosing end-portions of light waveguides, or (ii) a plurality of light waveguides without ferrules, wherein the ferrules or light waveguides are adhesively fastened in a spaced relationship from each other to one side surface of the micro-lens array by means of an adhesive. In one embodiment, bonding between the adhesive applied to neighboring ferrules or light-waveguides is prevented by providing at least one of trenches, barriers, and coatings between the ferrules or the light waveguides on the one side surface of the micro-lens array on which the ferrules or light-waveguides are fastened. In an alternative embodiment, adhesive which has been applied to neighboring ferrules or light wave-guides to form adhesive joints between the ferrules or light-waveguides and the surface of the micro-lens array, and which has run together to form overlapping neighboring adhesive joints, is removed from between the ferrules or light-waveguides to prevent bonding between the neighboring adhesive joints.

BRIEF DESCRIPTION OF THE DRAWINGS

In the following the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
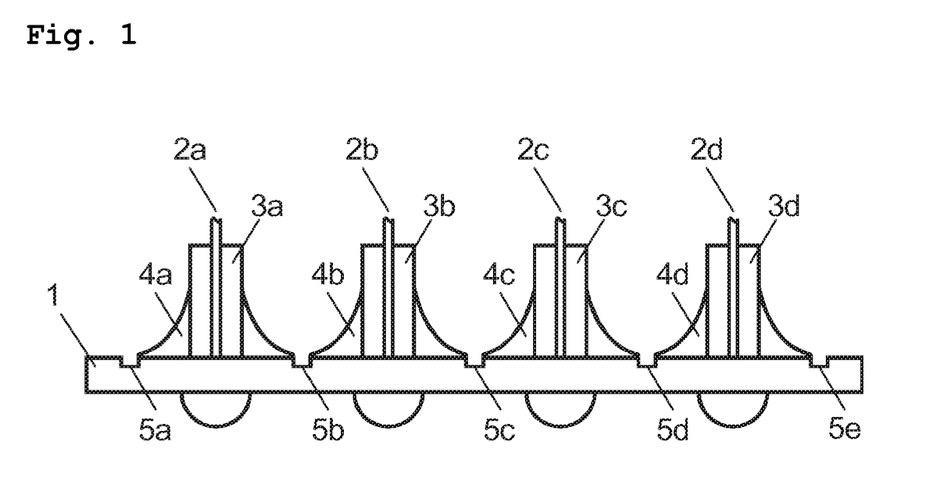
FIG. 1 shows a side view of an embodiment of a lens system having trenches between ferrules.

FIG. 1 shows a side view of an embodiment of a lens system having a micro-lens array 1 including at least one support plate with at least one lens. In FIG. 1, trenches 5a, 5b, 5c, 5d are formed between the ferrules 3a, 3b, 3c, 3d disposed on the support plate of the micro-lens array 1. Light-waveguides 2a, 2b, 2c, 2d are attached to the support plate of the micro-lens array 1 by means of the ferrules 3a, 3b, 3c, 3d. The ferrules 3a, 3b, 3c, 3d are adhered to the support plate by means of adhesive 4a, 4b, 4c, 4d. In the embodiment of FIG. 1, the trenches 5a, 5b, 5c, 5d are provided between the adhesives to prevent bonding between the adhesives of neighboring adhesive joints.

In the following description of embodiments, like components are designated with like reference numerals. In addition, reference will be made to the term "ferrule" for the sake of simplicity. However, the term "ferrule" may be used herein to describe the combination of a ferrule together with its corresponding light-waveguide, and other ferrule-like components. In some cases, a single reference numeral (e.g., the reference numeral 2) may be used to denote an entirety of the individual like components (e.g., individual light-waveguides 2a, 2b, 2c, 2d). This applies to all such components of the lens systems described herein.

Figure 2:
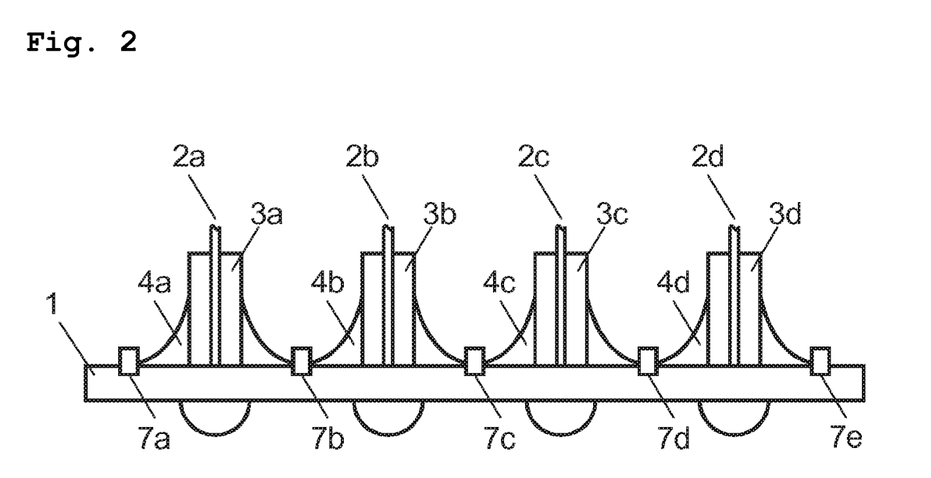
FIG. 2 shows a side view of another embodiment of a lens system having barriers between ferrules.

FIG. 2 shows a side view of another embodiment of a lens system, similar to that shown in FIG. 1. The embodiment shown in FIG. 2 differs from the previous embodiment by providing barriers 7a, 7b, 7c, 7d, 7e between neighboring adhesives 4, instead of the trenches 5a, 5b, 5c, 5d, 5e shown in FIG. 1. These are also effective in preventing bonding between adhesives of neighboring adhesive joints.

Figure 3:
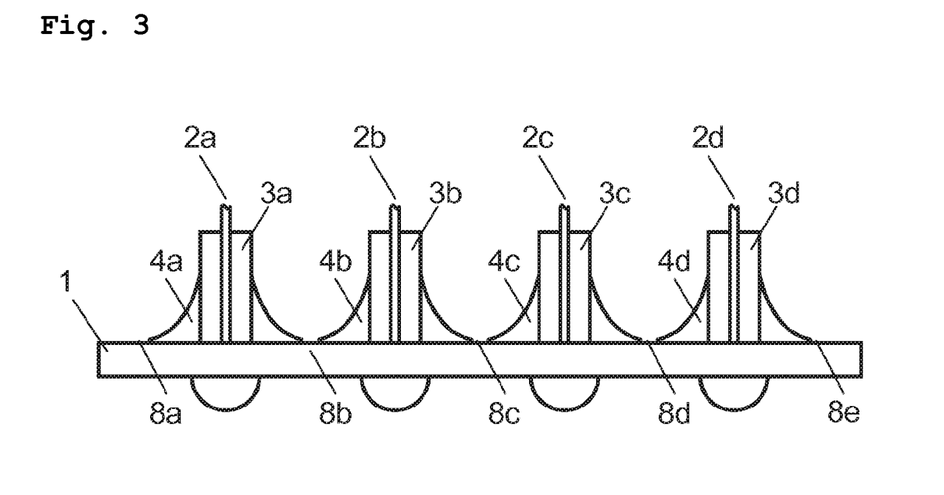
FIG. 3 shows a side view of another embodiment of a lens system having coatings between ferrules.

FIG. 3 shows a side view of another embodiment of a lens system, similar to that shown in FIGS. 1 and 2. The embodiment shown in FIG. 3 differs from the previous embodiments by providing a coating 8a, 8b, 8c, 8d between the adhesives 4, instead of the trenches 5 shown in FIG. 1 or the barriers 7 shown in FIG. 2. The coating has adhesive-repellent properties and cannot be wetted by the adhesive. Thus, no bonding can occur between adhesives of neighboring adhesive joints.

Figure 4:
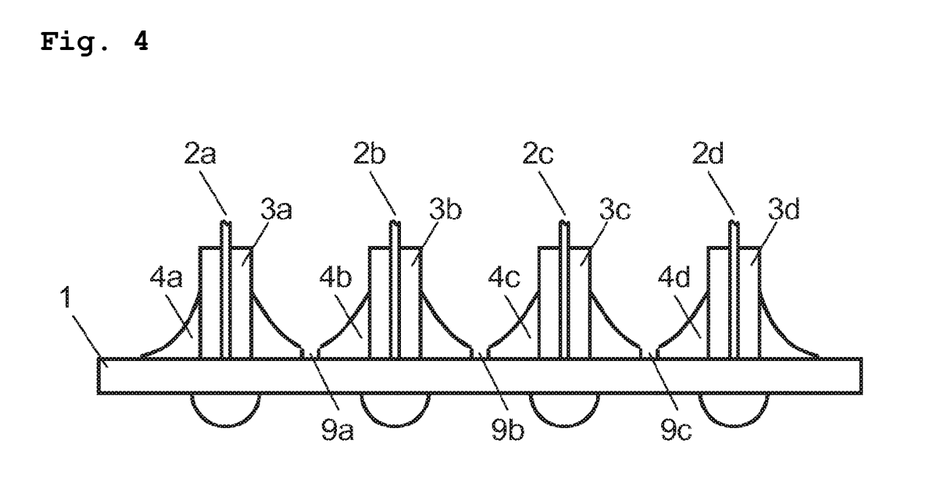
FIG. 4 shows a side view of another embodiment of a lens system, in which adhesive between the ferrules has been removed.

FIG. 4 shows a side view of yet another embodiment of a lens system, in which the adhesives 4 between the ferrules 3 have been removed at positions 9a, 9b, 9c.

Figure 5:
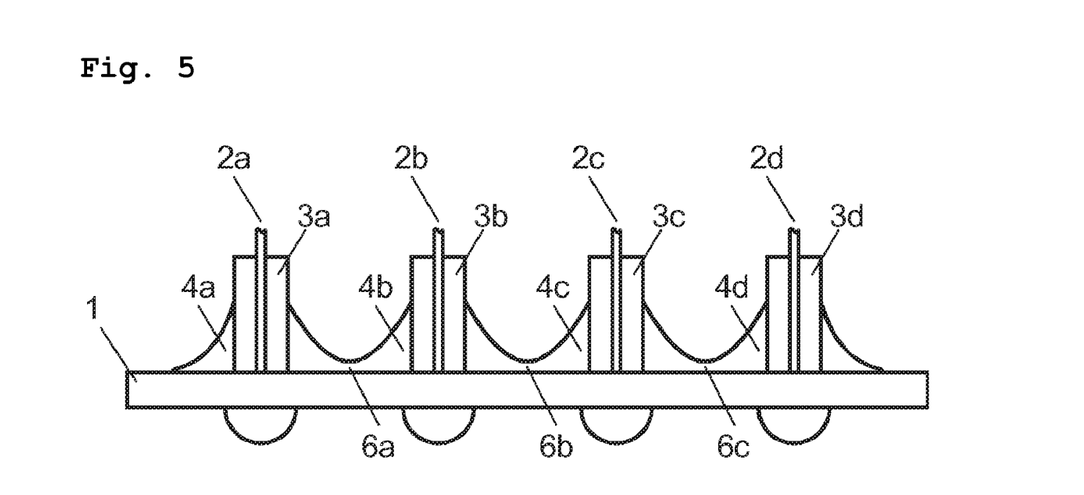
FIG. 5 shows a side view of a lens system according to prior art.

FIG. 5 shows a side view of a lens system according to prior art. In this figure, the adhesives 4 of the individual ferrules 3 run together at the positions 6a, 6b, 6c, and thus, form mechanical bonds which lead to undesired tensional forces between the ferrules 3 after curing.

Figure 6:
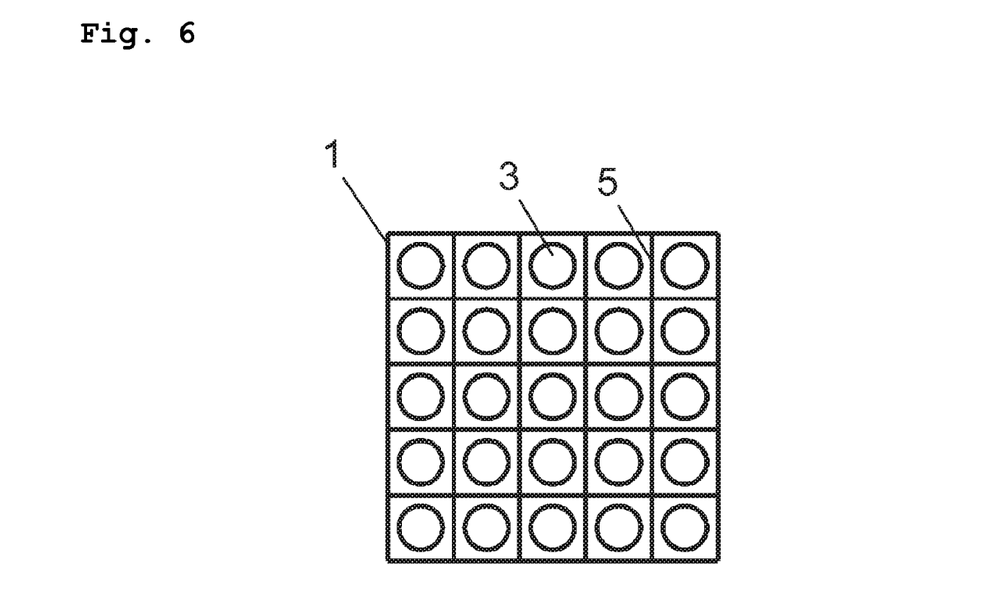
FIG. 6 shows a plan view of a lens system according to any one of the embodiments shown in FIGS. 1 to 4.

FIG. 6 shows a plan view of a lens system according to any one of the preferred embodiments shown in FIGS. 1 to 4. For example, the horizontal and vertical lines between the ferrules 3, which are shown as circular shapes, for example, may depict the trenches 5 shown in FIG. 1. Alternatively, the horizontal and vertical lines between the ferrules 3 could be barriers 7, coatings 8, or positions 9 of removed adhesive, as shown in the embodiments of FIGS. 2-4. It is essential that one of the above-mentioned trenches 5, barriers 7, coatings 8, or positions 9 of removed adhesive be provided between the individual ferrules 3 to prevent neighboring adhesive joints from bonding. In some embodiments, one of the trenches 5, barriers 7, coatings 8, or positions 9 of removed adhesive is also provided at the edge of the micro-lens array 1 to prevent a bonding of the adhesive 4 with other components at the edge.

Figure 7:
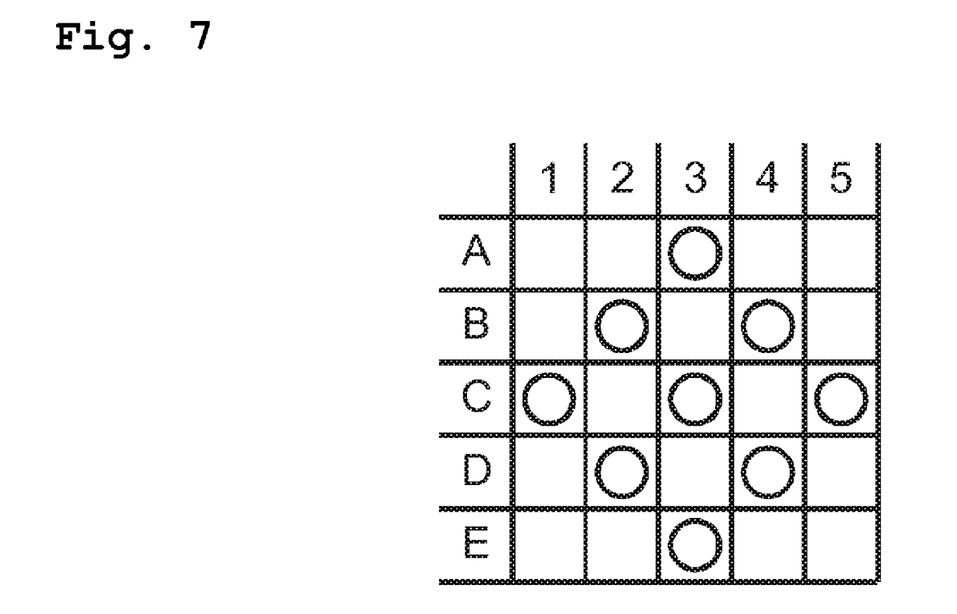
FIG. 7 shows a plan view of a lens system similar to FIG. 6, but having 9 channels.

FIG. 7 shows a plan view of a lens system, which is similar to that of FIG. 6, but having 9 channels instead of the 25 channels shown in FIG. 6. In addition, the channels shown in FIG. 7 are arranged in a matrix having the rows A, B, C, D, E and the columns 1, 2, 3, 4, 5. Because individual collimators (i.e., the combination of a ferrule 3 and corresponding light wave-guide 2) are adjacent to neighboring collimators only along a diagonal direction, spacing between the collimators can be increased, which further reduces bonding between adhesives of neighboring ferrules. Such an arrangement may be sufficient to prevent adhesive bonding between the ferrules, even without the above-described use of trenches, barriers, coatings, or a removal of adhesive. However, an improvement is achieved when the lens arrangement shown in FIG. 7 is used together with these means.

Figure 8:
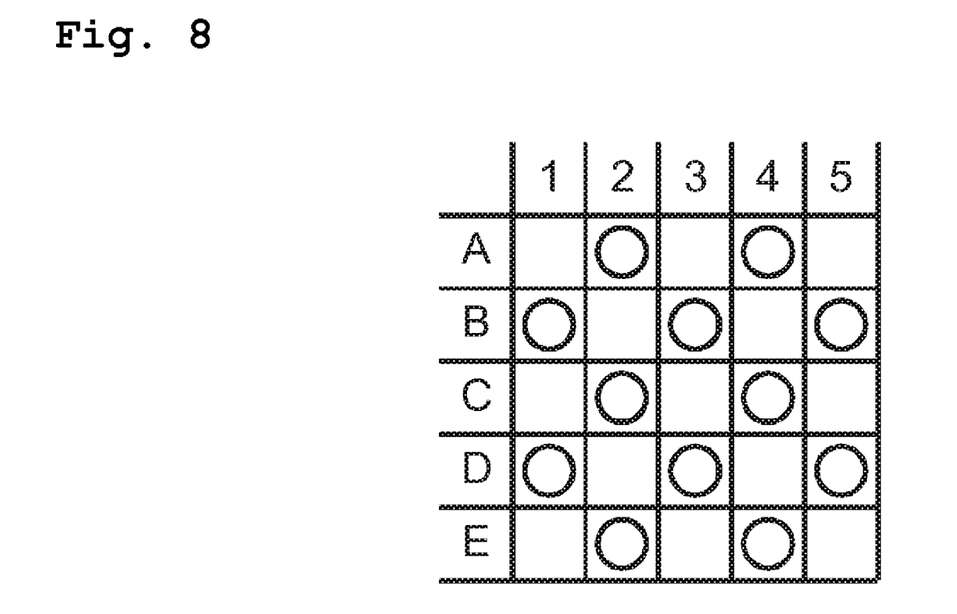
FIG. 8 shows a plan view of a lens system similar to FIG. 6, but having 12 channels.

FIG. 8 shows a plan view of an embodiment of a lens system similar to that shown in FIG. 7, however, with 12 channels corresponding to 12 ferrules with 12 light-waveguides.

Figure 9:
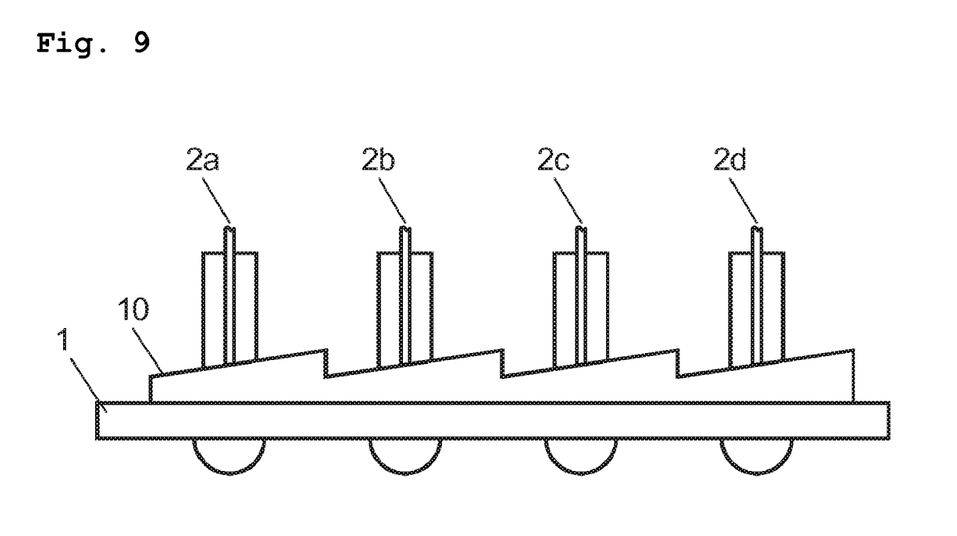
FIG. 9 shows a side view of a lens system according to prior art, having a plate of varying thickness for increasing return loss.

FIG. 9 shows a side view of an embodiment of lens system having a micro-lens array 1, upon which are mounted light wave-guides 2, ferrules 3 and a plate 10 of varying thickness in accordance with prior art. A disadvantage of this plate is the difficult adjustment, and also the danger of tensile forces arising in the micro-lens array 1.

Figure 10:
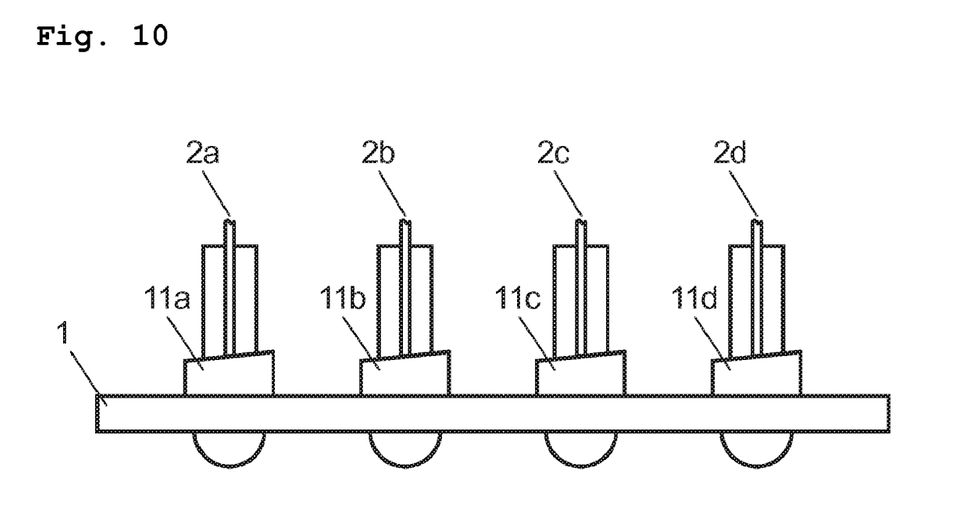
FIG. 10 shows a side view of a lens system having ferrules disposed on shaped glass bodies for increasing return loss.

FIG. 10 shows a side view of an embodiment of a lens system having a micro-lens array 1, in which the light wave-guides 2 and ferrules 3 are disposed on shaped glass bodies (i.e., glass profiles) 11a, 11b, 11c, 11d having an inclined upper surface. In FIG. 10, return losses on the boundary face between the light-waveguides 2 and the shaped glass bodies 11 are reduced, compared to the return loss provided at the boundary between the light-waveguides 2 and the plate 10 shown in FIG. 9. Furthermore, the relatively small shaped glass bodies 11 are easy to manufacture, and prevent the mechanical tensile forces that occur with the micro-lens array 1 shown in FIG. 9.

Figure 11:
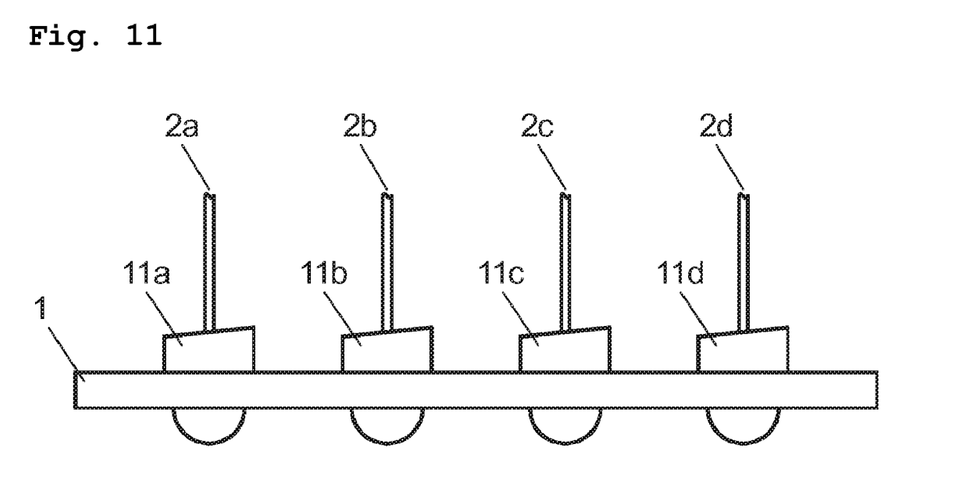
FIG. 11 shows a side view of a lens system having light wave-guides disposed on shaped glass bodies for increasing return loss.

FIG. 11 shows a side view of an embodiment of a lens system having a micro-lens array 1, similar to that shown in FIG. 10. In this embodiment, however, the light-waveguides 2 are disposed on the micro-lens array 1 without ferrules on the shaped glass bodies 11a, 11b, 11c, 11d having inclined surfaces. The light-waveguides 2 can be fastened to the shaped glass bodies 11, for example, by welding or splicing, or with an adhesive. Thus, in a first fabrication step, the light-waveguides 2 can be adjusted on and fastened to the glass bodies 11. Together with the light-waveguides 2, the glass bodies 11 then can be fastened onto the micro-lens array 1 in a second fabrication step. Basically, all of the embodiments described herein can be fabricated by fastening the light-waveguides 2 directly onto the micro-lens array, a glass plate, or a plurality of shaped glass bodies.

Figure 12:
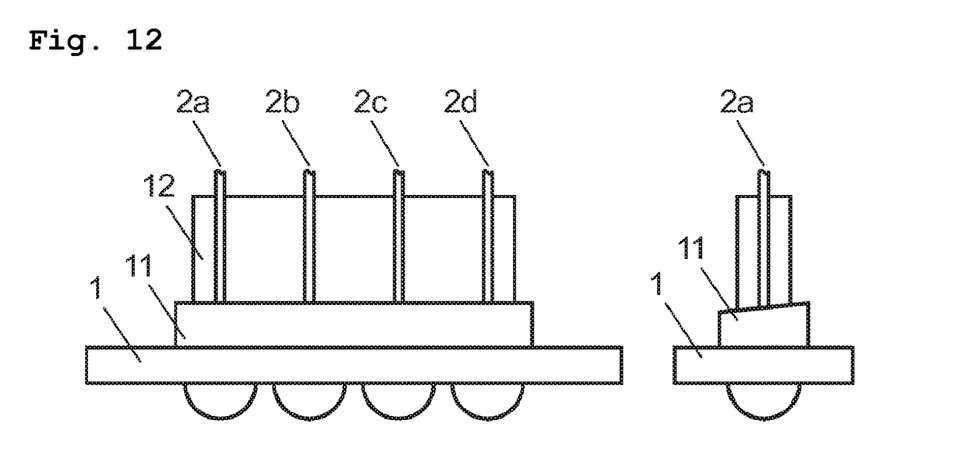
FIG. 12 shows a side view of a lens system having a fiber array in combination with a shaped glass body for increasing return loss.

FIG. 12 shows a side view of an embodiment of a lens system having a micro-lens array, which is similar to that shown in FIG. 11. In FIG. 12, however, the light-waveguides 2 are disposed in a fiber array 12, which in one embodiment, comprises a holder having V-shaped grooves. Similarly, a holder having accommodating bores, formed for example in silicon, can be also used. A holder of this kind is disclosed, for example, in U.S. Pat. No. 6,328,482. This holder performs the function of the individual ferrules shown in FIGS. 1-4 and 10. As the holder described in the U.S. patent provides a one-piece fiber array, the outlay of adjustment of such a holder is substantially less than with a plurality of individual ferrules. Accordingly, the individual shaped glass bodies 11 shown in FIG. 12 must be designed to be larger, so that they are compatible with the fiber array 12. The drawing shows only one single fiber array 12 with a single shaped glass body 11. However, a plurality of fiber arrays 12 and shaped glass bodies 11 can be disposed on a micro-lens array 1 in accordance with FIG. 11. On the right-hand side of FIG. 12, the lens system is illustrated as if it were rotated by 90°. The rotated figure enables the inclination of the shaped glass body 11 to be distinctly seen.

Figure 13:
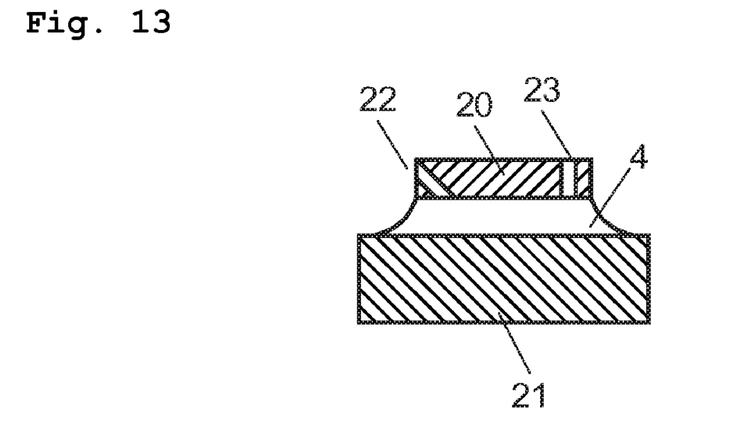
FIG. 13 shows a first embodiment of an optical arrangement with bores for guiding UV light to an adhesive joint.

FIG. 13 shows a first embodiment of an optical arrangement having bores 22, 23 for supplying UV light to an adhesive joint 4. A first part 20 (first optical component) is fixed to a second part 21 (second optical component) by means of an adhesive 4. In this example, the first part 20 and the second part 21 are not transparent to light, and in some cases, may exhibit high attenuation of UV light. One of the parts 20, 21 can be, for example, a ferrule or another fiber holder comprised of a material such as a metal or a ceramic. Curing of the adhesive 4 by lateral light irradiation between the first part 20 and the second part 21 is hardly possible, because light must be introduced into a relatively narrow gap (i.e., the gap between the first part 20 and the second part 21) to the far inside of the adhesive, and only small radiation intensities can be achieved in the inside because of light absorption by the adhesive.

Therefore, light-guiding channels such as, for example, the first bore 22 and the second bore 23 are provided in the first part 20 to cure the adhesive 4 between the first part 20 and the second part 21. In addition or alternatively, one or more light-guiding channels can be provided in the second part 21 for curing the adhesive 4. Light from an external light source (not shown) can be conducted through these light-guiding channels 22, 23 to the inside of the adhesive-filled intermediate space between the first part 20 and the second part 21. For this, the light-guiding channels 22, 23 are preferably designed for guiding light with low attenuation of UV light. Polishing the walls of the channels is one way in which to reduce light attenuation within the channels. It is of special advantage to insert light-guides, which have a low attenuation of UV light, into these channels. This prevents an entry of the adhesive, which typically has a higher optical attenuation than the light-guides, into the light-guiding channels. It is also possible to provide additional channels, which may be used to fill the intermediate space between the first part 20 and the second part 21 with adhesive.

Figure 14:
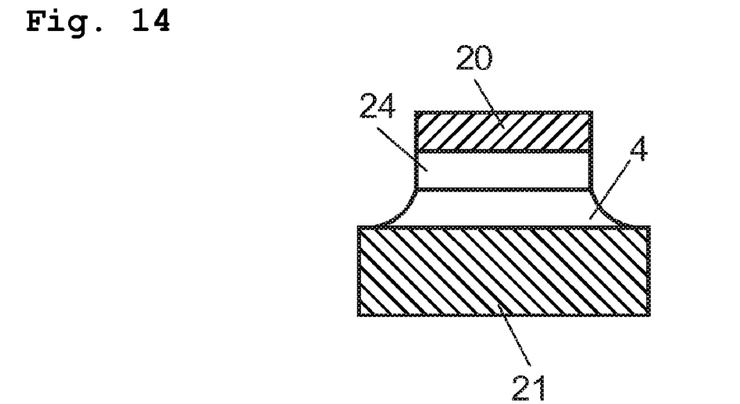
FIG. 14 shows a second embodiment of an optical arrangement with a transparent intermediate substrate.

FIG. 14 shows a second embodiment of an optical arrangement, similar to that shown in FIG. 13, but with a transparent intermediate substrate 24. A transparent intermediate substrate 24, which has a boundary face adjacent to the adhesive 4, is provided between the first part 20 and the second part 21. The transparent intermediate substrate 24 preferably has a low transit attenuation for UV light and is preferably designed so that it achieves a uniform light deflection of outside light coupled laterally into the adhesive 4.

Figure 15:
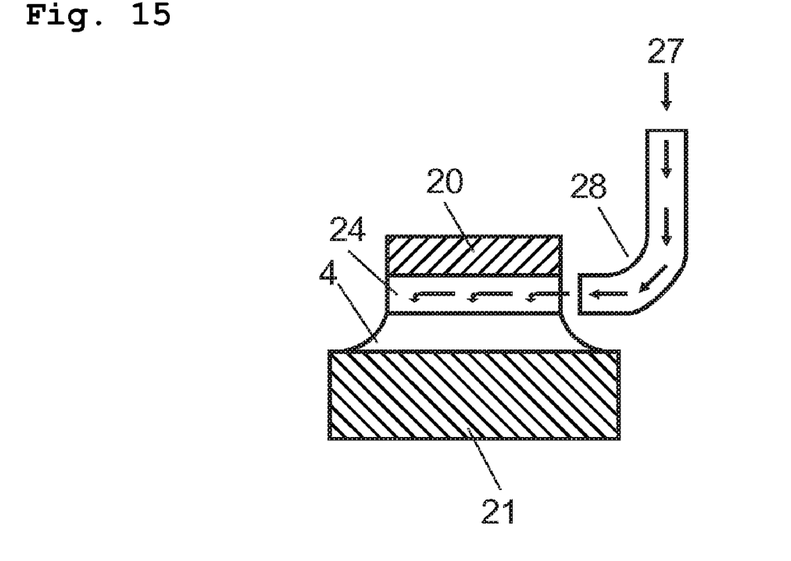
FIG. 15 shows a third embodiment of an optical arrangement with a transparent intermediate substrate, and a light guide for guiding light from externally coupled-in UV radiation.

FIG. 15 shows a third embodiment of an optical arrangement with a transparent intermediate substrate 24. In FIG. 15, UV radiation 27 is coupled into the intermediate substrate 24 laterally from an external light source (not shown) by means of a light guide 28. The light conducted in the intermediate substrate 24 is then deflected into the adhesive 4, as illustrated by arrows.

Figure 16:
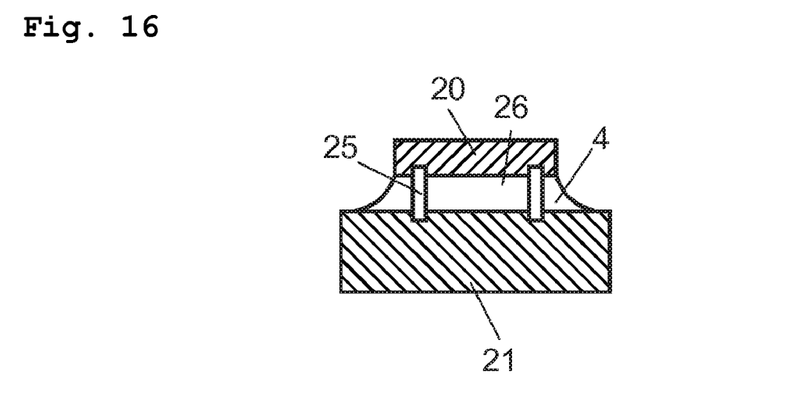
FIG. 16 shows a fourth embodiment of an optical arrangement with insulated layers of adhesive.

FIG. 16 shows a fourth embodiment of an optical arrangement with isolated layers of adhesive. In this embodiment, the inner part of the intermediate space between the first part 20 and the second part 21 is filled with a second adhesive 26, whilst the edge regions are filled with the first adhesive 4. At least one separating ridge or spacer 25 is provided to separate the two adhesives from each other. In one embodiment, the separating ridge or spacer can be a ring. A first adhesive 4 curable with UV light is inserted into the outer regions, as described previously, whilst a preferably anaerobic-curing second adhesive 26 is present on the inside. Initially, a first fixing is effected with the outer adhesive 4 which is cured by UV light. A stable joint is achieved with the slowly curing adhesive 26.

Figure 17:
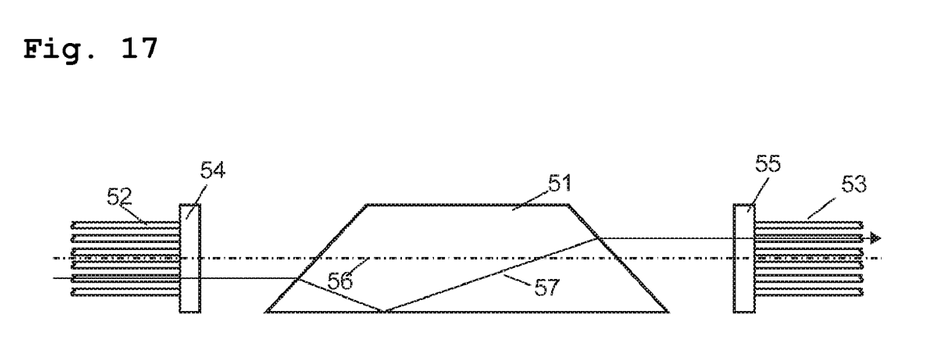
FIG. 17 shows an embodiment of an optical rotary joint comprising at least one of the lens systems described herein.

FIG. 17 shows an embodiment of an optical rotary joint having at least one lens system in accordance with at least one of the embodiments described herein. The optical rotary joint shown in FIG. 17 comprises a first collimator arrangement 54 for coupling-on first light-waveguides 52, and a second collimator arrangement 55 for coupling-on second light-waveguides 53. The second collimator arrangement 55 is supported to be rotatable relative to the first collimator arrangement 54 about a rotation axis 56. A derotating element in the form of a Dove prism 51 is located in a beam path between the first collimator arrangement 54 and the second collimator arrangement 55 to compensate for the rotary movement. An example of a ray path of a light ray 57, which starts from one of the first light-waveguides 52 and passes via the first collimator arrangement 54, through the Dove prism 51, and via the second collimator arrangement 55 up to and into one of the second light-waveguides 53 is illustrated in FIG. 17. The lens systems described herein can be a part of a collimator arrangement, or also a collimator arrangement by itself.

Figure 18:
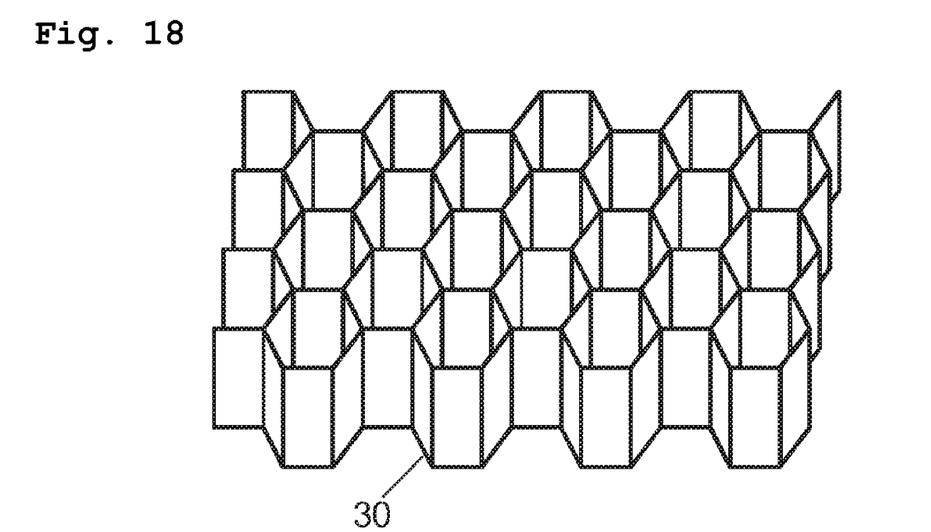
FIG. 18 shows a honeycomb profile according to the invention.

FIG. 18 shows a honeycomb profile 30 having a honeycomb structure.

Figure 19:
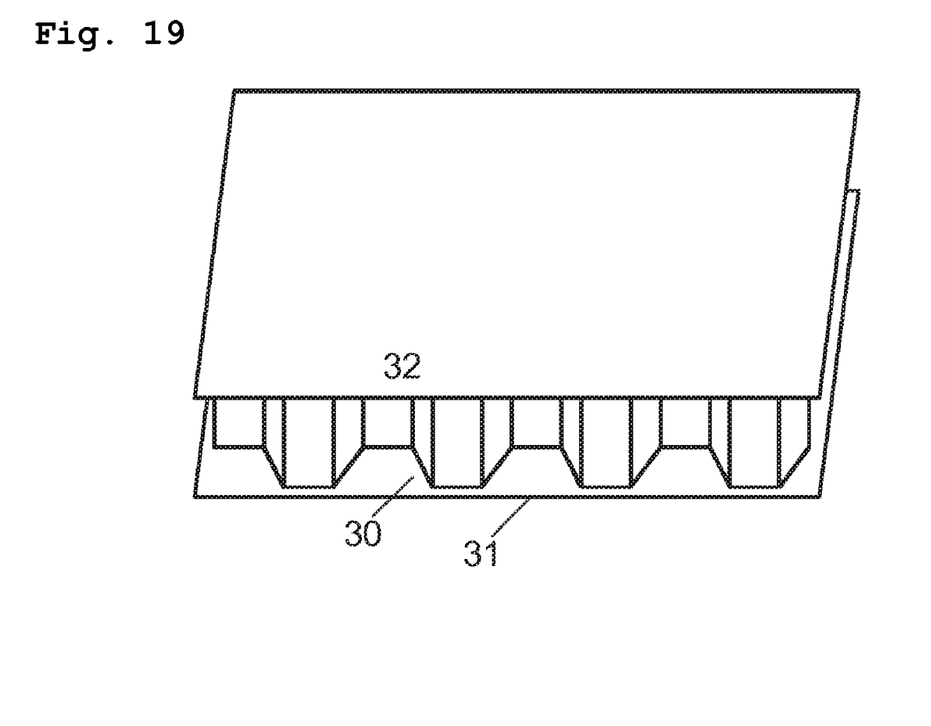
FIG. 19 shows the honeycomb profile with cover faces.

FIG. 19 shows the honeycomb profile 30 of FIG. 18 with cover faces. The cover faces 31, 32 of the honeycomb profile 30 can be, for example, the first part 20 and the second part 21 of the optical arrangements shown in FIGS. 13-16.

A lens system according to the embodiments described herein has a micro-lens array 1, which includes at least one support plate with at least one lens. A plurality of light-waveguides 2a, 2b, 2c, 2d are disposed on the support plate. These light-waveguides are held in place by ferrules 3a, 3b, 3c, 3d. Attachment of the ferrules 3 to the support plate is effected by means of an adhesive 4. A cured epoxy resin is preferably used as an adhesive.

In some cases, the adhesive joints 4 of neighboring ferrules may overlap, as shown in the conventional lens system of FIG. 5. An unfortunate side effect of having overlapping adhesive joints 6a, 6b, 6c is that early failures repeatedly occurred in the lens system of FIG. 5. After completing laborious investigations of these failures, the present inventors attributed these failures to interior tensile forces within the conventional lens arrangement. It was surprisingly found that these early failures almost completely ceased when an overlapping of, or bonding between, neighboring adhesive joints was reliably avoided. Thus, the present inventors concluded that the reliability of micro-lens arrays and optical rotary joints could be substantially increased by preventing neighboring adhesive joints from bonding or overlapping.

In one embodiment (FIG. 1), an overlapping of this kind is avoided when trenches 5a, 5b, 5c, 5d, 5e or grooves are provided between the ferrules 3 in the micro-lens array 1. The trenches 5 effectively prevent an overlapping of, or bonding between, the individual adhesive joints. Normally, the adhesive 4 does not flow into the trenches 5 because of its surface tension. This results in sufficient space between the adhesive joints of neighboring ferrules 3.

In another embodiment (FIG. 2), separating ridges or barriers 7a, 7b, 7c, 7d, 7e are disposed between the individual ferrules 3 to prevent neighboring adhesive joints from bonding. These barriers preferably comprise a material having an adhesive-repelling surface, so that no firm bond is formed between the adhesive and a barrier. Alternatively and/or additionally, the barriers can comprise an elastic material, so that no forces are transmitted between the adhesive joints of neighboring ferrules. The barriers can be disposed on the micro-lens array 1 before an adhesive 4 is applied, or already provided as structural elements of the micro-lens array 1. A barrier of this kind can be a separate component or a layer of lacquer. Preferably, the barriers 7 are removed following a curing of the adhesive 4. This may be effected thermally, as with a laser, or chemically as by etching.

In another embodiment (FIG. 3), a coating 8a, 8b, 8c, 8d, 8e is provided between the individual ferrules 3 to prevent neighboring adhesive joints from bonding. This coating has adhesive-repelling properties. This may be achieved, for example, by increasing the surface tension with the coating. The area covered by the coating cannot, or can hardly, be wetted by the adhesive 4. Thus, a bonding between the adhesive joints of neighboring ferrules can be avoided. A suitable coating is achieved, for example, with a lacquer resist, a plasma treatment (preferably with SiOx), or an application of oil.

Another embodiment (FIG. 4) consists in effecting a separation of the adhesive joints following a curing of the adhesive 4. Thus, preferably, a strip of the adhesive between the ferrules is abraded. Preferably, a laser is used for this.

In another embodiment (FIGS. 7-8), the individual ferrules 3 are disposed on the surface of the micro-lens array 1 at positions which, when referred to a rectangular matrix, have closest spacing from each other only along a diagonal direction of the matrix. Because of this diagonal arrangement, the spaces between neighboring ferrules are larger and the contacting surfaces between the ferrules are smaller.

According to another embodiment (FIG. 11), the light-waveguides 2 are attached to the micro-lens array, or a glass plate, or shaped glass bodies (profiles) without ferrules. Attachment is effected preferably with an adhesive, or also by welding and/or splicing.

According to another embodiment, a plurality or all of the aspects described in this document can be combined with each other.

Another aspect of the disclosure provided herein is the reduction of early failures with means for increasing the return loss of the lens system. It is generally well known that beveling the coupling face between the light-waveguide 2 and the micro-lens array 1 minimizes reflections in the light-waveguide. Conventional lens systems (FIG. 9) typically use a plate 10 of varying thickness, having inclined faces. However, this leads to the problem of high mechanical tension forces between the plate 10 and the micro-lens array 1, and thus, to reduced reliability. Furthermore, a plate 10 of varying thickness can hardly be produced by photolithography. The problems associated with the conventional lens system of FIG. 9 can be solved by using individual shaped glass bodies 11a, 11b, 11c, 11d, which are each assigned to one respective light-waveguide as shown in FIGS. 10-12. In the case that these individual shaped glass bodies 11 are fastened to the micro-lens array 1 with an adhesive, the previously described measures for preventing an overlapping of adhesive joints can be applied.

According to another aspect of the disclosure provided herein, the lens system and also a method for manufacturing a lens system of this kind is further developed so that curing of the adhesive joint becomes possible within a space of time which is suitable for typical production operations, without any heating of the components to be adhered to each other, or the adhesive joint, or an adjusting device being performed, which would otherwise cause additional mechanical strain or movement between the components to be adhered to each other. This is considered to occur particularly with optically non-transparent materials such as, for example, special steel. In order to achieve an accelerated fixing of the optical components, light-guiding structures are provided in the ferrules to conduct UV radiation to the adhesive (see, e.g., FIG. 13).

Light-guiding structures of this kind can be, for example, light-guiding channels (such as bores 22, 23, FIG. 13) extending from outside the ferrule as far as the adhesive joint. It is of special advantage when bores of this kind are polished or reflectively coated in order to improve light transmission. It is also of advantage when light-guiding fibers (not shown) are inserted into the bores. This prevents the adhesive from entering into the bores. As the light-guiding fibers typically have a lower attenuation of UV light than the adhesive, light can be supplied with small attenuation into the inner regions of the adhesive for curing the adhesive faster.

A supply of light through a large surface can also be effected by providing a component, which has the profile of a honeycomb light-guiding structure (see, FIGS. 18-19), between two optical components (e.g., a first part and a second part), which are to be coupled with adhesive. Similarly, with a component having a partially light-transmitting porous light-guiding structure, a supply of light onto a large area can be achieved.

An especially advantageous optical arrangement results when an intermediate substrate 24 of a transparent material, preferably glass, is provided which is bounded by the adhesive 4 on one side, as shown in FIGS. 14-15. The intermediate substrate 24 guides the UV light at low attenuation into the inside of the region between the first part 20 and the second part 21 of the optical arrangement. It diffusely scatters the UV light, so that the adhesive joint between the first and second parts is uniformly irradiated with the UV light. Advantageously, the scattering action is controlled in a concerted manner by volume or surface structures, so that, for example, a gradient of the scattering action occurs from the outside to the inside. A micro-lens array can also be provided as a light-guiding structure, so that the supply of UV light can be effected through the micro-lens array. However, it is of special advantage to employ even further the light-guiding structures as described above.

Basically these light-guiding structures can be provided between the components to be adhesively joined, or on the components to be adhesively joined, such as light-waveguides, ferrules, micro-lens arrays, and others.

The lens system described herein, and the corresponding fabrication method are of special advantage also for single-channel rotary joints for which pre-fabricated collimators in metal housings are used. These are then often incorporated in metal sleeves. An example of a rotary joint of this kind is disclosed in European Patent No. EP 1 857 847. It is intended here that EP 1 857 847 be completely incorporated in the contents of the present document.

Using the light-guiding structures described herein, a lens system can be fabricated with the following process steps:
1. Inserting a micro-lens array into an adjustment device.
2. Assembling the components to be adhered to each other (e.g., joining the ferrules to one side of the micro-lens array), which have been provided with UV curable adhesive.
3. Adjusting a position of at least one of the components (e.g., one of the ferrules) relative to the micro-lens array.
4. Fixing the positions of the components by at least partially curing the adhesive with the curing being initiated by irradiation with UV light, which is guided through the light-guiding structures. Basically, only hand-tight curing is necessary for the fixing step. However, further curing can be also effected.
5. Removing the fixed components from the adjustment device.
6. Completely curing the adhesive. This can be effected by storing it for the time needed for curing, or also by storing it at a higher temperature of the surroundings. Storage at increased temperature of the surroundings is now possible, because the parts fastened together are temperature-compensated, but not necessarily the adjustment device.

As the adhesive, an epoxy resin or also a methacrylate resin can be used, for example.

The method described above can be also modified in some embodiments. For example, instead of fixing the positions of the components with a partially cured adhesive, a rapidly curing resin adhesive can be applied following the adjustment step. For this, preferably channels are provided in one or more of the optical components for supplying the adhesive, so that the adhesive may be guided to the adhesive joints by effects of capillary pressure, or by external pressure. In another alternative, adhesive layers, which are spatially insulated from each other, can be used. This makes it possible to use differently performed curing methods. For example, and as shown in FIG. 16, an edge region of the adhesive can be subjected to accelerated curing by irradiation with UV light, whilst the interior of the adhesive is cured more slowly, but to greater hardness. For this, preferably a means for separating different adhesives is provided, preferably a separating ridge 25. However, it is also possible to use only one kind of adhesive which, for example, is subjected to anaerobic curing on the inside following a first curing process at the edge, started by UV light. An adhesive of this kind can be, for example, a urethane methacrylate.

An optical rotary joint in accordance with an embodiment described herein comprises at least one first lens system 54 for coupling-on first light-waveguides 52, and at least one second lens system 55 for coupling-on second light-waveguides 53 (see, e.g., FIG. 17). Both lens systems 54, 55 are supported to be rotatable relative to each other about a rotation axis 56, and are optically linked to each other via a derotating optical element (e.g., a Dove prism 51), which is disposed in a light path between the two lens systems. At least one of the lens systems comprises the above-indicated features of the invention, and/or has been manufactured according to the above-indicated method. As an alternative to a Dove prism, the derotating optical element can be an Abbe-König prism, or any other desired derotating optical element.

An optical rotary joint in accordance with an embodiment described herein comprises at least one of the lens systems described herein, instead of the usual collimator arrangements or lens systems known in the art. Accordingly, a rotary joint as disclosed in U.S. Pat. No. 5,568,578 can be designed to have, instead of GRIN lenses on each side of a Dove prism, one lens system according to the embodiments described herein on each side. Although not illustrated herein, rotary joints without a derotating element, such as for example single-channel rotary joints, can be modified to include one of the lens systems described herein. Similarly, rotary joints using for example a mirror trench or segments thereof as a light guide, can be fitted with embodiments of the lens systems described herein.

A method for manufacturing a lens system for optical rotary joints comprises the steps of: (a) providing a micro-lens array 1; (b) optionally manufacturing trenches 5, barriers 6, or a coating 8 on a support surface of the micro-lens array; (c) adhesively fixing ferrules 3 to the support surface of the micro-lens array 1; and (d) optionally removing adhesive 4 from between the ferrules 3.

In some embodiments, steps (a) and (b) can be performed as one common manufacturing step. In some embodiments, an additional step of curing the adhesive 4 may be provided between the steps (c) and (d). The step (d) can also be performed with only partially cured adhesive.

The here described lens systems or optical components, and the methods for their manufacture are preferably used with optical rotary joints. However, they can be used also in any other field of optics.

The invention claimed is:

1. A lens system, comprising:
   a micro-lens array;
   a plurality of ferrules enclosing end-portions of light-waveguides, wherein the plurality of ferrules are adhesively fastened in a spaced relationship from each other to one side surface of the micro-lens array by means of an adhesive; and
   wherein bonding between the adhesive of neighboring ferrules is prevented by providing adhesive-repellant coatings on the one side surface of the micro-lens array between each of the ferrules adhesively fastened on the one side surface of the micro-lens array.

2. The lens system according to claim 1, wherein one or more light-guiding structures are provided in the ferrules, or between the ferrules and the one side surface of the micro-lens array, for directing UV radiation onto the adhesive.

3. The lens system according to claim 2, wherein the light-guiding structures are selected from a group comprising: bores, light-guiding fibers inserted within bores, a honey-comb structure, a partially light-transmitting porous structure, or an intermediate substrate of glass.

4. The lens system according to claim 1, wherein the plurality of ferrules are arranged on the micro-lens array in a rectangular matrix, such that the neighboring ferrules are arranged diagonally relative to each other.

5. A lens system, comprising:
   a micro-lens array;
   a plurality of light-waveguides adhesively fastened in a spaced relationship from each other to one side surface of the micro-lens array by means of an adhesive; and
   wherein bonding between the adhesive of neighboring light-waveguides is prevented by providing adhesive-repellant coatings on the one side surface of the micro-lens array between each of the light-waveguides adhesively fastened on the one side surface of the micro-lens array.

6. An optical rotary joint for transmitting modulated optical signals, comprising:
   two units supported to be rotatable relative to each other;
   a derotating optical element disposed within a beam path between the two units; and
   at least one lens system disposed on one of the two units, the at least one lens system comprising:
   a micro-lens array;
   a plurality of ferrules enclosing end-portions of light-waveguides, wherein the plurality of ferrules are adhesively fastened in a spaced relationship from each other to one side surface of the micro-lens array by means of an adhesive; and
   wherein bonding between the adhesive of neighboring ferrules is prevented by providing adhesive-repellant coatings on the one side surface of the micro-lens array between each of the ferrules adhesively fastened on the one side surface of the micro-lens array.

* * * * *